United States Patent [19]

Brandt

[11] 4,113,116
[45] Sep. 12, 1978

[54] DEVICE FOR TOWING ROLLED BALES OF HAY

[75] Inventor: Paul W. Brandt, McHenry, N. Dak.

[73] Assignee: David W. Brandt, McHenry, N. Dak.

[21] Appl. No.: 791,030

[22] Filed: Apr. 26, 1977

[51] Int. Cl.$^2$ .......................................... A01D 90/12
[52] U.S. Cl. ................... 214/1 HA; 214/350; 294/111; 294/116; 242/86.5 R
[58] Field of Search ............... 214/1 HH, 1 HA, 350, 214/351, 353, 390, 147 R, 147 G; 294/111, 116; 242/86.5 R

[56] References Cited

U.S. PATENT DOCUMENTS

| 561,674 | 6/1896 | Kuriger | 214/350 |
| 3,807,786 | 4/1974 | Alegria | 294/116 X |
| 3,860,282 | 1/1975 | Johnson | 214/147 G X |
| 4,008,862 | 2/1977 | Wilmes | 242/86.5 R |
| 4,032,184 | 6/1977 | Blair | 214/147 G X |

FOREIGN PATENT DOCUMENTS 903,122  8/1962  United Kingdom ..................... 294/116

*Primary Examiner*—L. J. Paperner
*Attorney, Agent, or Firm*—Robert E. Kleve

[57] ABSTRACT

The invention comprises a device for towing and transporting a roll of hay, said device having a pair of arms with points at their rearward outer ends for engagement into a roll of hay. The pair of arms are pivotably connected at their forward ends. A lever means is provided having means at its forward end for attachment to a power drive vehicle. The lever means acts upon being moved forward to lever the rearward outer ends of the device toward one another, whereby, with the device attached to the vehicle and a roll of hay attached to the device, the forward movement of the vehicle moves the device forward and also moves the lever forward to tighten the hold of the device to the roll of hay to assure the device tows the roll of hay forward.

5 Claims, 12 Drawing Figures

U.S. Patent  Sept. 12, 1978  Sheet 1 of 2  4,113,116
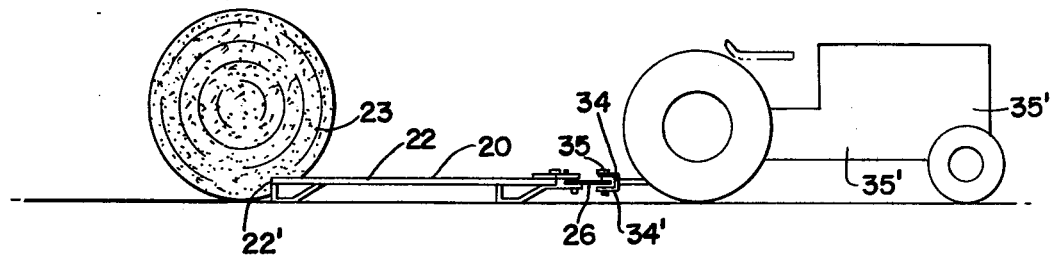
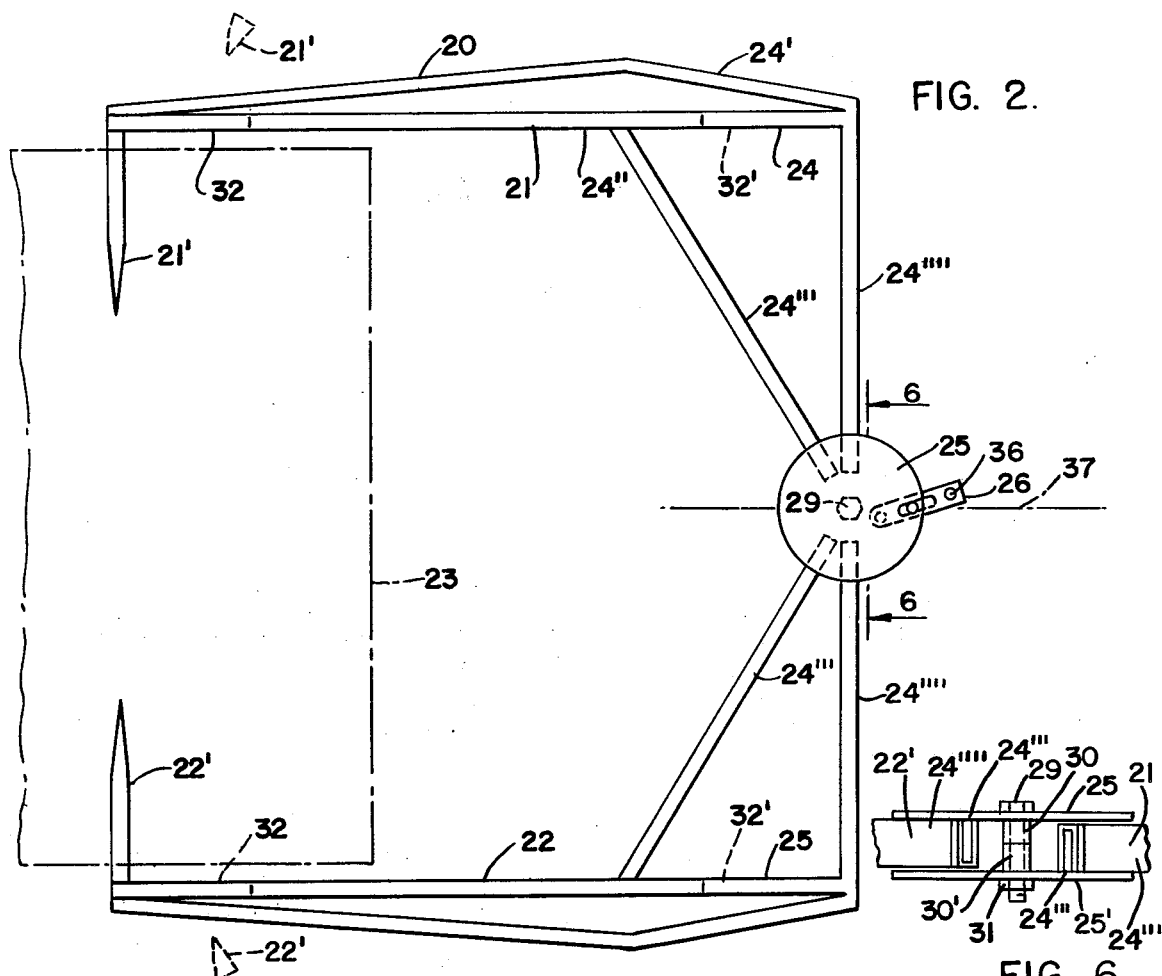
FIG. 2.
FIG. 3.
FIG. 6.
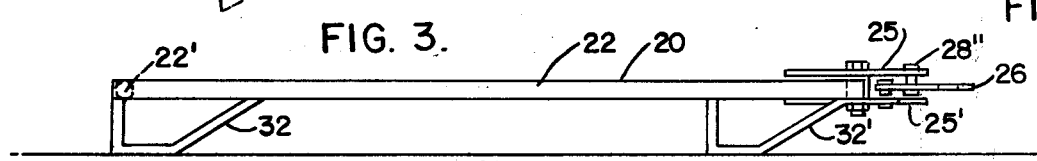
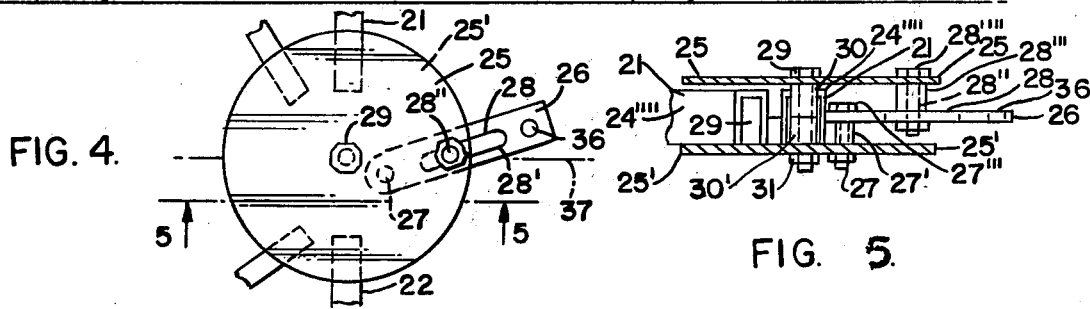
FIG. 4.
FIG. 5.

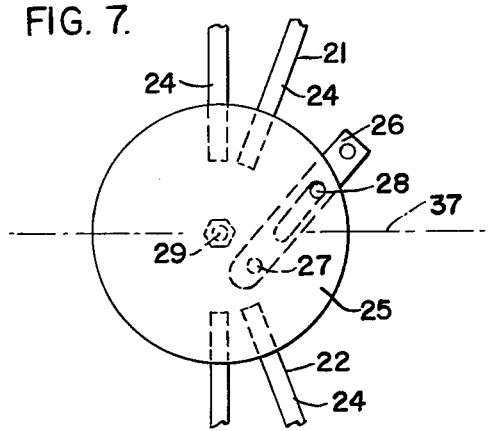
FIG. 7.
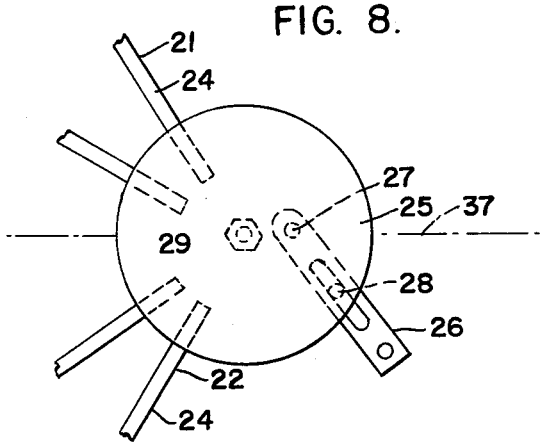
FIG. 8.
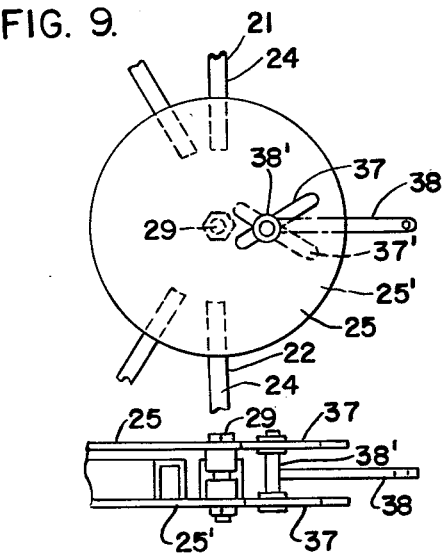
FIG. 9.
FIG. 10.
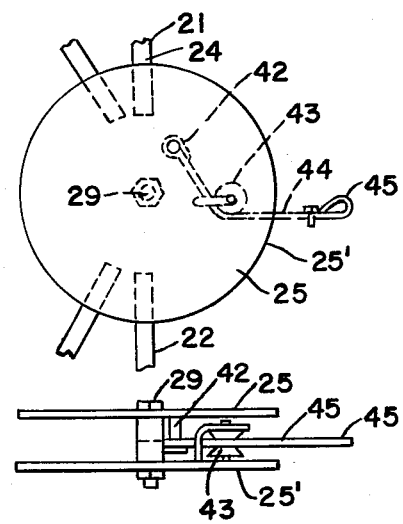
FIG. 11.
FIG. 12.

DEVICE FOR TOWING ROLLED BALES OF HAY

This invention relates to farm equipment, more particularly the invention relates to a farm device for towing, transporting and/or unrolling rolled bales of hay and similar objects.

It is an object of the invention to provide a novel device for grasping, towing, and transporting and/or unrolling large rolled bales of hay and the like from behind a power driven vehicle.

It is another object of the invention to provide a novel device for grasping and moving large bales of hay and similar objects.

It is a further object of the invention to provide a novel device for easily towing and transporting and, if desired, unrolling rolled bales of hay easily and rapidly.

Further objects and advantages of the invention will become apparent as the description proceeds and when taken in conjunction with the accompanying drawings.

FIG. 1 is a side elevational view of the device for towing, transporting and/or unrolling rolled bales of hay, with the device attached to a rolled bale of hay for towing, and with the device mounted behind a tractor for towing the device and the bale of hay.

FIG. 2 is an enlarged top plan view of the device for towing, transporting, and unrolling large bales of hay.

FIG. 3 is an enlarged side elevational view of the device.

FIG. 4 is an enlarged top plan view of the lever mechanism for leveling the arms of the towing device toward one another while towing the bale of hay.

FIG. 5 is a cross-sectional view of the lever mechanism taken along line 5—5 of FIG. 1.

FIG. 6 is a cross-sectional view taken along line 6—6 of FIG. 1.

FIG. 7 is a top plan view of the lever mechanism with the arms shown expanded.

FIG. 8 is a top plan view of the lever mechanism with the arms shown contracted together by the lever mechanism.

FIG. 9 is a top plan view of a first modified form of the lever mechanism, illustrating a sliding pin construction.

FIG. 10 is a side elevational view of the first modified form of lever mechanism.

FIG. 11 is a top plan view of a second modified form of lever mechanism, utilizing a pulley and cable construction for moving the arms.

FIG. 12 is a side elevational view of the second modified form of the lever mechanism.

Briefly stated, the invention comprises a pair of arms having points at their outer ends and a pivotal connection at their inner rearward ends. Each arm has a plate fixed to its inner forward end a lever arm is positioned between the plates with the lever arm pivotably connected to one plate and connected to the other plate by a slot and pin connection, whereby the points of the pivotal pair of arms may be attached to a rolled bale of hay and the forward end of the lever arm pivotably attached to a hitch of a tractor and the forward force upon the lever arm as the tractor moves forward while towing will pivot the lever arm relative to the pair of arms and plates to draw the pair of arms toward one another to more firmly engage the points of the pair of arms to the rolled bale of hay while it is being towed.

Referring more particularly to the drawings in FIGS. 1 and 2, the device 20 for towing, transporting and/or unrolling a rolled bale of hay is illustrated. In FIG. 1 the device 20 is illustrated with the points 21' and 22' of the arms 21 and 22 attached to the lower forward part of the bale or rolled hay. The arms 21 and 22 have an identically complementary shape to one another, as illustrated in FIG. 2. Each arm has an L-shaped portion 24 with the points 21' and 22' fixed to the outer edge of the L-shaped portion of the arms and projecting inwardly toward one another. The arms have each a plate 25 and 25' fixed to the inner end of arms 21 and 22, respectively, at the rearward end of their L-shaped portions. A lever arm 26 is positioned between plates 25 and 25'. The lever arm is pivotally connected to plate 25' by a pin 27 and connected to plate 25 by a pin and slot connection 28. The lever arm has a slot 28' and a pin 28" and is slidably mounted in the slot and is fixed to the plate 25. A pin or bolt 29 pivotally connects the plates 25 and 25' and the arms 21 and 22 together. The pin 27 has an enlarged collar portion 27' and the pin 28" has an enlarged collar 28''' with an enlarged head portion 27'''' and 28''''.

The plate 25 has a sleeve portion 30 and the plate 25' has a sleeve portion 30". The bolt 29 passes through the plate 25 and its sleeve portion 30 and through sleeve 30' of plate 25' and through plate 25' and a nut 31 is locked onto the lower end of the bolt.

The lever arms have each a pair of skids or runners 32 and 32' fixed to the underside.

Each arm 21 and 22 has the L-shaped portion 24 with a reinforcing brace 24' bent outward in the middle and fixed to the ends of portion 24" and a lateral brace 24''' fixed between portion 24" and portion 24'''' of the L-shaped member 24. The L-shaped portion 24 and its reinforcing brace and its lateral brace of arms 21 and 22 all lie in the same horizontal plane with arm 21 slightly lower than arm 22.

The ends of the portion 24'''' and the brace of arm 21 are fixed to disc 25' and the ends of the portion 24'''' and the brace of arm 22 are fixed to disc 25 so that plate 25' pivots with arm 21 and plate 25 pivots with arm 22.

It has been found that for towing a roll of hay, it is desirable to attach the points 21' and 22' to a lower forward position of the roll of hay for easier towing.

To attach the device to the roll of hay 23, the arms 21 and 22 of the device will be spread apart so that the points 21' and 22' are in the position shown in phantom lines 33 and 33', and the lever mechanism will be in its position shown in FIG. 7. The pair of lever arms 21 and 22 will be pushed toward one another pivoting about pin 29 one at a time to insert the points one at a time into the roll of hay so that the points are in the position in solid lines in FIGS. 1 and 2.

The lever arm 26 of the device will than be attached between the plates 34 and 34' of the hitch of the tractor by a pin 35 inserted through bores in the hitch and through the bore 36 in the lever arm.

The roll of hay can now be towed from place to place by the tractor 35' moving forward from left to right as viewed from FIG. 1. The forward movement of the tractor through the attachment of the tractor to the lever arm, moves the device forward. The force of the forward movement of the tractor upon the lever arm 26 also will pivot the lever arm 26 clockwise relative to the arms when viewed from FIGS. 2 and 3, causing the pair of arms to pivot together thereby tightening the hold of the pairs of arms and their points upon the roll of hay so as to assure the device will tightly grasp the roll of hay as the device acts to pull the roll of hay forward.

The clockwise movement of the lever arm 26 causes the pair of arms to move toward one another by the lever arm along the slot 28' engaging the pin 28" of plate 25' while the lever pivots about pin 27, attached to plate 25, to move the pairs of arms and lever mechanism from the position shown in FIGS. 2, 4, and 5 toward position shown in FIG. 7.

The clockwise movement of the lever arm from its position shown in FIG. 4 toward its position shown in FIG. 7 will cause the pin 28" to move inward relative to the slot until the lever arm passes parallel the center line 37 after which time the pin will start moving outward in the slot upon further clockwise movement of the lever.

The spreading of the arms 21 and 22 apart from the position shown in FIG. 2 to the position shown in FIG. 7 will cause the lever arm 26 to move counterclockwise from its position shown in FIG. 2 to its position shown in FIG. 7.

The lever arm 26 will normally not pass a parallelism with the center line 37 in its clockwise movement from its position shown in FIG. 4 in towing, since the sides of the arms 21 and 22 will normally engage the opposing sides of the bail before the lever arm reaches that point.

Consequently, in a normal towing or pulling operation, there is continuous force upon the arms 21 and 22 to contract together so long as there is forward pressure upon the lever arm 26. This force, however, is only applied upon the arms as long as there is forward pressure upon the lever arm 26, by the tractor moving forward.

With the release of the towing pressure upon the lever arm 26, the arms 21 and 22 are free to be spread apart or contracted together and may be freely spread apart by grasping and pulling one arm 21 or the other arm 22 with the weight of one arm providing enough drag so that the other arm may be swung outwardly relative to the one arm about its pivot. The lever 26 will move back and forth in response to the normal spreading and contracting of the arms 21 and 22.

Thus, it will be seen that a novel device has been provided for easily towing a roll of hay from place to place and which will automatically tighten its hold upon the roll of hay while it is being towed. The device will normally slide along the ground on the skids while towing the bale or roll of hay behind it with the roll of hay sliding on the ground.

When it is desired to unroll the roll of hay, the points of the device instead of being inserted at a forward lower position of the roll will be inserted at the center axis of the roll of hay and the lever arm of the device will be attached to a tractor in the same manner.

It has been found that the roll of hay need only be towed a few feet or a slight distance when towed from the center axis of the roll of hay before the weight of the roll of hay in rolling will cause the twine binding the roll of hay together to break and the roll of hay will simply unroll as the tractor continues to tow the roll forward from left to right, as viewed from FIG. 1, to form a flat strip upon the ground.

It has been found that it is easier for cattle and the like to feed upon the hay if the hay is unrolled into a flat strip upon the ground.

A first modified form of lever mechanism is illustrated in FIGS. 9 and 10. The pair of arms 21 and 22 are fixed to their respective discs or plates 25 and 25' have reversely angled slots 37 and 37'. A lever arm 38 has a vertical pin 38' fixed to its rearward ends which is slidable in the slot 37 and 37' from right to left or left to right when viewed from FIG. 9. The pin 38' has annular collar 39 fixed at intervals to retain the pin in the slot.

The lever arm 38 has a bore 40 at its forward end for attachment to the hitch of the tractor by inserting the pin through the pin and through the bore 40.

Upon forward movement of the tractor from left to right after the device has been attached to a roll of hay, the lever arm 38 will be drawn forward causing pin 38' to engage against the slots 37 and 37' from left to right, causing the plate 25' to move clockwise and the plate 25 to move counterclockwise thereby causing the arms 21 and 22 to pivot toward one another to thereby tighten the hold of the arms to the roll of hay while the tractor moves forward with the roll of hay being towed.

A second modified form of lever mechanism is illustrated in FIG. 11. The pair of arms 21 and 22 are fixed to their respective discs 25 and 25'. A cable 41 is provided. The cable is attached at one end to a pin 42, which pin 42 is attached to plate 25. A pulley 43 is rotatably mounted on a pin 43' fixed to plate 25'. The cable 41 passes around pulley 43 and the outer end of the cable forms an eyelet 45. The eyelet portion 45 of the cable is attached to the hitch of a tractor by a pin passing through bores in the hitch and through the eyelet, so that upon forward movement of the tractor, after the device has been attached to a roll of hay, the cable 41 will be drawn forward which draws the tightened cable about the pulley 43, thereby drawing plate 25 toward plate 25', thereby drawing the arms 21 and 22 toward one another.

It will be obvious that various changes and departures may be made to the invention without departing from the spirit and scope thereof and accordingly, it is not intended that the invention be limited to that specifically described in the specification, as illustrated in the drawings, but only as set forth in the appended claims wherein.

What is claimed is:

1. A device for towing and transporting a roll of hay or the like comprising a pair of elongated, longitudinally extending arms each having lateral extending points at its rearward ends extending laterally inward toward one another, said pair of arms each having a laterally extending elongated arm portion fixed to the forward ends of the longitudinal arms and extending laterally inward toward one another, relatively small plate means mounted to each of said arms at the lateral inner ends of said arm portions, pivotal connecting means acting to pivotally connect said arms and plate means together at the lateral inner ends of the arm portions, said relatively small plate means being relatively small in relation to the length of said arms, leverage means mounted between said small plate means closely adjacent said pivotal connection to lever said arms, whereby said leverage takes place relatively close to the pivot in relation to the rearward outer ends of the arms, said lever means being movably mounted to move forward to lever said plate means about the pivotal connection to lever the arms toward one another at their rearward outer ends, whereby when towing the device forward with the lever means attached to the vehicle and the points engaged to a roll of hay, the forward movement of the vehicle will move the device forward and the forward movement of the vehicle will also move the lever means forward to lever the lateral arm portions toward one another to thereby move the longitudinal arms and the points toward one another to tighten the hold of the points to the roll of hay.

2. A device for towing and transporting a bale of hay according to claim 1, said plate means mounted to each arm comprises a pair of plates fixed to the lateral arm portions respectively, with said pivotal connection being connected between the plates, said lever means comprises a lever arm pivotally connected to one of the plates by a pivotal connection and connected to the other plate by a pin and slot connection, whereby a forward force on the lever arm will cause the lever arm to pivot about the pivotal connection with the pin and slot connection pivoting the one of the pair of plates toward the other of the pair of plates causing the rearward outer ends of the arms to pivot toward one another.

3. A device for towing and transporting a bale of hay according to claim 1, said plate means mounted to each arm comprises a pair of plates fixed to the lateral arm portions respectively, with said pivotal connection being connected between the plates, said plates have reversely angled slots forming a part of said lever means, said lever means having a lateral pin mounted in said slots whereby forward movement of the tractor while the lever means is attached to the tractor and the device is attached to a roll of hay, causes the pin to move forward engaging the plates along the angled slots with the engagement of the pin to the plate causing the plates to pivot toward one another to cause the rearward outer ends of the pair of arms to pivot toward one another.

4. A device for towing and transporting a bale of hay according to claim 1, said plate means mounted to each arm comprises a pair of plates fixed to the lateral portions respectively, with said pivotal connection mounted between the plates, said lever means comprising a cable with one rearward end of the cable attached to one plate, a pulley rotatably mounted to the other plate, said cable passing around the pulley, said forward end of the cable having means to attach to a tractor whereby forward movement of the tractor while the lever means is attached to the tractor and the device is attached to a roll of hay causing the cable to tighten about the pulley thereby causing one plate to pivot toward the other plate to cause the rearward outer ends of the pair of arms to pivot toward one another.

5. A device for towing and transporting a bale of hay according to claim 1 wherein said device includes ground supporting means mounted to said longitudinal arms along portions including the rearward portions for supporting said longitudinal arms spaced above the ground for facilitating the towing of the device along the ground when towing the hay.

* * * * *